United States Patent [19]

Karkare et al.

[11] Patent Number: 5,736,600
[45] Date of Patent: Apr. 7, 1998

[54] MORTAR ADMIXTURES AND METHOD OF PREPARING SAME

[75] Inventors: Milind V. Karkare, Newton; Chia-Chih Ou, Lexington; Craig T. Walloch, Arlington; Ara A. Jeknavorian, Chelmsford, all of Mass.

[73] Assignee: W.R. Grace & Co.-Conn., New York, N.Y.

[21] Appl. No.: 693,769

[22] Filed: Aug. 7, 1996

[51] Int. Cl.$^6$ .............................. C08K 5/09; C04B 14/34
[52] U.S. Cl. .............. 524/400; 524/650; 524/2; 106/802; 106/808; 106/822
[58] Field of Search ................. 524/400, 650, 524/2; 106/802, 808, 822

[56] References Cited

U.S. PATENT DOCUMENTS

| | | | |
|---|---|---|---|
| 4,355,079 | 10/1982 | Rosenberg et al. | 428/469 |
| 4,471,100 | 9/1984 | Tsubakimoto et al. | 525/378 |
| 4,946,506 | 8/1990 | Arfaei et al. | 106/724 |
| 4,946,904 | 8/1990 | Akimoto et al. | 525/327.8 |
| 5,100,984 | 3/1992 | Burge et al. | 526/240 |
| 5,393,343 | 2/1995 | Darwin et al. | 106/808 |
| 5,634,966 | 6/1997 | Berke et al. | 106/14.41 |

FOREIGN PATENT DOCUMENTS

303139/92  8/1993  Japan.

OTHER PUBLICATIONS

The Jeffamine Polyoxyalkyleneamines, published, 1995 (Texaco Chemical Co.).

*Primary Examiner*—Jeffrey T. Smith
*Attorney, Agent, or Firm*—Craig K. Leon; William L. Baker

[57] ABSTRACT

Additive which simultaneously provides water-repellency and flexural bond strength improvement in mortar, concrete, or cement. An exemplary composition include calcium stearate and a flexural bond strength enhancing material comprising a polymer having a backbone to which are attached carboxyl cement anchoring groups. A cementious composition and method for enhancing water-repellency and flexural bond strength in a mortar are also disclosed.

18 Claims, No Drawings

MORTAR ADMIXTURES AND METHOD OF PREPARING SAME

FIELD OF THE INVENTION

The present invention relates to hydraulic cement admixtures, and more particularly to a masonry mortar admixture comprising calcium stearate and a polymer having carboxyl cement anchoring groups, the admixture being operative to improve the flexural bond strength and water repellency of masonry mortar.

BACKGROUND OF THE INVENTION

Masonry mortar is the bonding agent used for integrating concrete blocks, clay bricks, concrete masonry units, and other masonry units into building or civil engineering structures. A function of the mortar is to provide a complete, strong, durable bond between the masonry units.

Another function of the mortar is to prevent leakage. Thus, water protection is a major performance consideration in masonry design. For example, a leaky masonry wall can lose durability and aesthetic appearance, such as through freeze-thaw damage, efflorescence, and interior surface damage, due to moisture penetration. To minimize the effect of moisture or water leakage in concrete masonry units, it is known to incorporate into the masonry unit and/or mortar a water-repellent material such as calcium stearate, which is available, for example, from PPG Industries, Pittsburg, Pa. Other water-repellent materials that can be used in concrete masonry units and mortars include soaps, fatty acids, wax emulsions, and methyl silicones. The addition of water-repellent materials effectively minimizes penetration of water through the individual masonry units and mortar joints.

However, one of the problems seen by the present inventors is that the incorporation of a water-repelling material into the mortar leads to the reduction in the flexural bond strength of the resultant mortar joint when cured. Flexural bond strength is conceptually different that compressive strength. For example, a wall made of stacked bricks joined by mortar, the stress level placed thereupon is more or less evenly distributed over the mortar joint. However, flexural load is placed upon the a mortar joint, for example, by the force of wind directed against a free-standing brick wall. In this case, the force on a particular mortar joint is not evenly distributed, but is rather akin to pulling one side of adjoining bricks apart in tension while forcing the other sides together in compression.

It is a purpose of the present inventors to discover a novel admixture and method for obtaining water repellency while avoiding a loss of flexural bond strength.

SUMMARY OF THE INVENTION

In surmounting the disadvantages of prior art, the present invention provides a composition for improving water repellency and flexural bond strength in mortar, comprising: (a) calcium stearate; and (b) at least one masonry flexural bond strength enhancing material comprising a copolymer having a carbon-containing backbone to which are attached cement-anchoring members and oxyalkylene groups attached by linkages comprising an amide, an imide, an ester or any combination thereof.

The term "cement anchoring" is meant to refer to ionic bonds formed between the polymer's carboxylate groups and the calcium cations in the wet cementitious mortar, while non-ionic pendant groups on the polymer backbone are believed to facilitate the dispersion of cement particle within the aqueous mortar mixture. Exemplary comb polymers comprise a backbone formed from ethylenically-unsaturated monomers, and, as nonionic pendant groups on the backbone, ethylene oxide (EO) groups, propylene oxide (PO) groups, or EO/PO groups. An exemplary masonry additive of the invention comprises calcium stearate in the amount of 5 to 50%, and more preferably 10–35%, (dry) weight total solids, and flexural bond strength enhancing polymer in the amount of 1 to 50%, and more preferably 3–20%, (dry) weight total solids.

The invention also provides a cementitious composition, which includes a mortar, comprising a cementitous binder, calcium stearate, and a flexural bond strength polymer as above described. An exemplary method of the invention involves providing, in a hydraulic cementitious composition, such as a mortar, calcium stearate and at least one flexural bond strength enhancing material as described above. Preferably, the calcium stearate is added in dispersion form, and, more preferably, as an additive pre-mixed with the flexural bond strength enhancing material.

Further features and advantages of the invention are provided hereinafter.

DETAILED DESCRIPTION OF EXEMPLARY EMBODIMENTS

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions of this invention may be formed by mixing required amounts of certain materials, e.g., a hydraulic cement, water, and fine or coarse aggregate, as may be applicable to make the particular cement composition being formed.

Exemplary admixtures of the invention comprise calcium stearate, preferably in dispersion form, and at least one flexural bond strength enhancing material. The calcium stearate can be used in the amount of 5–50%, and more preferably 10–35%, (dry) wt. solids, and the flexural bond strength enhancing material can be used in the amount of 1 to 50%, and preferably 3–20%, (dry) wt. solids. An exemplary improved cement composition of the invention comprises a mixture of a hydraulic cement, and the above described calcium stearate and bond strength enhancing material in a materials:cement ratio of from 0.001 to 0.05.

Exemplary flexural bond strength enhancing materials of the present invention can comprise a polymer backbone to which are attached carboxyl cement anchoring groups and non-ionic pendant groups, as further described hereinafter.

Preferred bond strength enhancing materials comprise imidized acrylic polymers or copolymers thereof, such as those taught in U.S. Pat. No. 5,393,343 assigned to W. R. Grace & Co.-Conn. and incorporated herein by reference. The polymer which is imidized is an "acrylic polymer," by which term is meant, for example, a homopolymer or copolymer of acrylic acid, methacrylic acid, their alkali metal salts, as well as their $C_1$–$C_{30}$ alkyl esters. Additionally, the acrylic polymer reactant and the resultant imidized acrylic polymer may contain units derived from other singly and doubly ethylenically unsaturated monomers, such as styrene, alpha-methystyrene, sulfonated styrene, maleic acid, acrylonitrile, butadiene and the like. Such other ethylenically unsaturated monomer derived units, when present, can be present in the polymer in amount of up to about 20 (preferably, up to about 10) weight percent of the total polymer, provided that the resultant imidized acrylic polymer is water soluble.

The imidized acrylic polymer may be formed such as by reacting an acrylic polymer with ammonia or an alkoxylated amine. The amine reactant useful in forming the desired acrylic polymer can be selected from ammonia or an alkyl-terminated alkoxy amine represented by the formula:

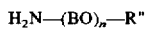

in which BO represents a $C_2$-$C_{10}$ (preferably a $C_2$-$C_4$) oxyalkylene group in which O represents an oxygen atom and B represents a $C_2$-$C_{10}$ (preferably a $C_2$-$C_4$) alkylene group or mixture; and R" represents a $C_1$-$C_{10}$ (preferably $C_1$-$C_4$) alkyl group and n is an integer selected from 1 to 200 and preferably from 1 to 70. The reaction conditions and catalysts are generally known. See e.g., U.S. Pat. No. 5,393,343 at Columns 3–4.

An exemplary imidized acrylic polymer that is suitable for use as a flexural bond strength enhancing material in the present invention has the structural formula of

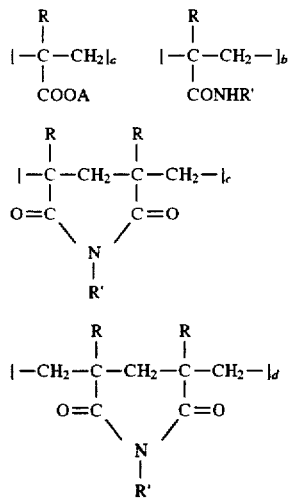

wherein each R independently represent a hydrogen atom or a methyl group ($CH_3$ group); A represents a hydrogen atom, a $C_1$-$C_{10}$ (preferably $C_2$-$C_4$) oxyalkylene group (BO) or a plurality (1–200, preferably from 1 to 70) of said groups which is terminated with a $C_1$-$C_{10}$ alkyl group (R") or mixtures thereof; and a, b, c, and d represent molar percentages of the polymer's structure such that a has a value of about 50–70; the sum of c plus d is at least 2 to a value of (100–a) and is preferably from 3 to 10; and b is not more than [100–(a+b+d)].

An exemplary imidized acrylic polymer useful as a flexural bond strength enhancing material herein is represented by the above formula in which A is a hydrogen atom or an alkali metal cation; R' is at least from 50–90 weight percent of the polymer and comprises polyoxyethylene or polyoxypropylene units or mixtures thereof. Further, a may have a numerical value of from 60–70, and the sum of c and d is a numerical value of at least 3 (preferably at least 5) to the value of (00–a).

Further exemplary flexure bond strength enhancing materials can be obtained by polymerization of ethylenically-unsaturated carboxylic acids to form the backbone, and grafting or otherwise attaching to the backbone a number of other non-ionic pendant groups. The backbone may comprise carboxylic acid grafting sites to which are covalently attached air-detraining functional side chains. The carbon backbone may optionally contain intervening atoms like oxygen (i.e., ether linkage). Suitable grafting sites include free carboxylic acid (or salt thereof) groups. Carbon backbones may be made by polymerization of ethylenically-unsaturated monomers, preferably ethylenically-unsaturated carboxylic acids (e.g., allyl carboxylic acids) such as acrylic, methacrylic, maleic, fumaric, citraconic, itaconic, (meth) allylsulfonic, vinyl sulfonic, sulfoethyl(meth)acrylic, 2-(meth)acrylamido 2-methylpropane sulfonic, mesaconic, or dicarboxylic acid half-esters. Preferred polycarboxylic acid carbon backbones are, e.g., polyacrylic or polymethacrylic acid. 5- to 200-mers are preferred, more preferably 5- to 150-mers, and 5- to 100-mers particularly preferred. Preferably about 5% or more of the carboxylic acid groups on the polycarboxylic acid backbone remain unesterified, more preferably about 10% or more.

Exemplary non-ionic pendant groups may comprise air detraining functional side chains which function chemically to stabilize entrained air quality and level in the cement or mortar, and are covalently attached to the grafting sites of the carbon backbone. The side chains may therefore comprise polyoxyalkylene groups of the general formula:

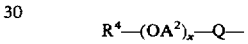

wherein

Q=O or NH;

$A^2$=$C_1$-$C_{10}$ alkylene;

x=1 to 200; and $R^4$=$C_1$-$C_{10}$ alkyl.

The term alkyl(ene) is meant herein to encompass linear or branched alkyl(ene) groups, and also include (where structurally possible) aryl(ene) and arylalkyl(ene) groups. In preferred air detraining functional side chains, $A^2$=$C_2$-$C_5$ alkylene; more preferably, the $OA^2$ groups are a mixture of ethylene oxide ("EO") and propylene oxide ("PO"). Air detraining performance appears to be particularly good when the weight ratio of EO/PO in the air detraining functional side chain is from about 3:1 to 0.3:1, more preferably from about 1.5:1 to 0.6:1. Q is preferably O, and x is preferably 1 to 100. $R^4$ is advantageously butyl, preferably a n-butyl group. It is believed that a range of polyoxyalkylene alcohols available from Huntsman Chemical Corporation (Houston, Tex.) under the tradename JEF-FOX will function suitable when incorporated as air detraining functional side chains in the flexural bond strength enhancing materials of the invention, e.g., JEFFOX WL5000 and WL660. These polyoxyalkylene alcohols have number average molecular weights of about 3500 and 1850, respectively, and have the formula $(C_4H_9)(OA^2)_xOH$, where $OA^2$ is a mixture of EO and PO, and the EO/PO weight ratio is ≈1:1.

Other exemplary polyoxyalkylene amines which can be grafted onto/attached to the carbon backbone of the bond strength enhancing materials herein may have the general formula:

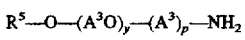

wherein $A^3 = C_1-C_{10}$ alkylene;

y=1 to 200;

p=1 to 50; and $R^5 = C_1-C_{10}$ alkyl.

Such polyoxyalkylene amines may be grafted or attached to the carbon backbone by an amide and/or imide linkage, in which case the attached group would have the formula $R^5-O-(A^3O)_y-(A^3)_p-N=$ (note that the "=" sign is meant to signify two covalent bonds to other atoms, for example, to two carbonyl carbons on the backbone, i.e., imide linkage, or to a hydrogen atom and a carbonyl carbon on the backbone). In preferred polyoxyalkylene amines, $A^3 = C_2-C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3-$). For example, polyoxyalkylene amines available from Huntsman Chemical Corporation (Houston, Tex.) under the tradename JEFFAMINE have been found suitable in the invention, e.g., JEFFAMINE M1000 and M2070, having number average molecular weights corresponding to their respective product numbers. The JEFFAMINES have the formula $CH_3O(A^3O)_yCH_2CH(CH_3)NH_2$, where $A^3O$ is a mixture of EO and PO.

The mole ratio of the acrylic acid monomer in the polyacrylic acid to a) polyoxyalkylene amine and b) polyoxyalkylene alcohol is generally about 2:1 to 9:1, and the weight ratio of a) to b) is generally about 20:1 to 2:1. It can easily be seen that by varying the amount of the polyoxyalkylene alcohol side chains grafted onto the backbone, bond strength enhancing polymers can be made in accordance with the invention which will produce corresponding variance in entrained air in the cementitious mix. One preferred bond strength enhancing material comprises polyacrylic acid ("PAA") to which has been grafted a) polyoxyalkylene amines of the formula $CH_3O(A^3O)_yCH_2CH(CH_3)NH_2$, where $A^3O$ is a mixture of EO and PO and the EO/PO weight ratio is from about 5:1 to 0.5:1 and b) polyoxyalkylene alcohols of the formula $(C_4H_9)(OA^2)_xOH$, where $OA^2$ is a mixture of EO and PO and the EO/PO weight ratio is ≈1:1.

Further exemplary flexural bond strength enhancing materials of the invention may include polymers having the formula

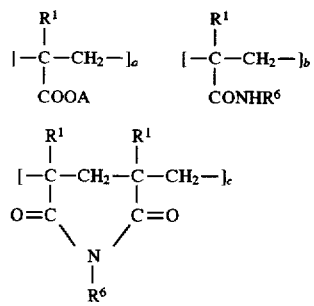

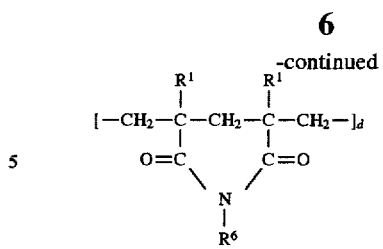

wherein each $R^1$ independently represents a hydrogen atom or a $C_1-C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(BO)_n R^3$ in which O represents an oxygen atom, B represents a $C_1-C_{10}$ alkylene group, $R^3$ represents a $C_1-C_{10}$ alkyl group and n represents an integer of from 1–200, or mixtures thereof; $R^6$ represents a polyoxyalkylene group represented by $(BO)_n R^3$; and a, b, c and d are numerical values representing molar percentage of the polymer's structure such that a is a value of about 1 to 99; the sum of c+d is a value of 0 to the numerical value of (100-a); and b is a remainder value of $|100-(a+c+d)|$.

a is preferably from about 30 to 99, more preferably from 50 to 99. In the $R^2$ group, B preferably represents a $C_2-C_5$ alkylene group, $R^3$ represents a $C_1-C_4$ alkyl group, and n represents an integer of from 1–100. More preferably, the BO groups are a mixture of EO and PO. Air detraining performance appears to be particularly good when the weight ratio of EO/PO is from about 3:1 to 0.3:1, more preferably from about 1.5:1 to 0.6:1. $R^4$ is advantageously butyl, preferably a n-butyl group.

$R^6$ represents a polyoxyalkylene group represented by $(BO)_n R^3$, and is advantageously $R^5-O-(A^3O)_y-(A^3)_p-$, wherein $A^3 = C_1-C_{10}$ alkylene; y=1 to 200; p=1 to 50; and $R^5 = C_1-C_{10}$ alkyl. Preferably, $A^3 = C_2-C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3-$). In a particularly preferred embodiment, a) $R^6$ is of the formula $CH_3O(A^3O)_yCH_2CH(CH_3)-$, where $A^3O$ is a mixture of EO and PO, and the EO/PO weight ratio is from about 5:1 to 0.5:1, and b) $R^2$ is of the $(C_4H_9)(OA^2)_xO-$, where $OA^2$ is a mixture of EO and PO and the EO/PO weight ratio is ≈1:1.

The exemplary flexural bond strength enhancing materials may be made by grafting a polyoxyalkylene amine onto a polycarboxylic acid backbone (amidization/imidization reaction), then grafting onto the polycarboxylic acid backbone an air detraining polyoxyalkylene alcohol (via esterification reaction). It is believed that the alcohol may also be grafted onto the backbone before grafting the amine onto the backbone. The reactions are carried out in an oxygen-free atmosphere, in a reaction vessel having a condenser for facilitating water removal, e.g., a jacketed-coiled condenser fitted with a Dean-Stark trap. (During the course of the reactions, water (a reaction by-product) is removed to drive the reaction to completion.) In the amidization/imidization step, the reactants which are contacted with each other and heated to 100° C. to about 185° C. for about 1 to 8 hours, preferably about 1.5 to 2.5 hours, or until the amidization/imidization is complete. (Again, reference is made to U.S. Pat. No. 5,393,343, the entire disclosure of which is incorporated herein by reference for further details of the reaction.) For the estertification reaction, a catalyst is added to catalyze the esterification of the polyoxyalkylene alcohol to the graft polymer. Any agent which will catalyze ester formation may be used (i.e., dehydrating agents, defined herein as those which facilitate the formation of water in chemical reactions; such as naphthalene sulfonic acid, carbodiimide, or p-toluene sulfonic acid), with p-toluene sulfonic acid preferred. The temperature is maintained at 100° C. to about 185° C. for about 1 to 8 hours, preferably about 1.5 to 2.5 hours, or until the esterification is complete. Water by-product is removed as above. The reaction vessel is cooled, the reaction product is neutralized and the total solids of the mixture are adjusted with solvent if desired or necessary for addition to a cement composition in a desired dosage. Other methods of preparation may be used as long as the resultant polymer has the characteristics described herein. For example, certain polyoxyalkylene bond strength enhancing polymers of the type obtained by polymerization of ethylenically-polymerizable carboxylic acids and ethylenically-polymerizable polyoxyalkylenes, as exemplified by U.S. Pat. Nos. 4,471,100 and 4,946,904, the entire disclosures of which are incorporated herein by reference. comprise a carbon backbone and grafting sites (carboxylic acid groups). It is intended that air detraining functional side chains as described herein may be esterified to the free carboxylic acid groups of these polyoxyalkylene bond strength enhancing polymers to impart the benefits detailed herein. Such resulting air-controlling bond strength enhancing polymers are intended to be within the scope of our invention.

It will be seen that the flexural bond strength enhancing polymer material can be added at any stage of the cement or mortar's formation or use. For example, the polymer, with or without the calcium stearate, can be mixed at the cement mill with clinker cement raw material during its grinding to form cement powder. The polymer can also be applied to the cement powder during its blending with other dry materials to prepare a specific type of cement, such as blended cement, pozzolanic cement and the like. Alternately, the improved cements of the invention can be formed in situ during the course of preparing a cement composition such as a mortar mix or a concrete. The bond strength enhancing polymer material, preferably in pre-mixed form together with the calcium stearate, in the form of a calcium stearate dispersion ("CSD"), can be added as an aqueous solution as part of the water of hydration, or can be added separately.

Further exemplary comb polymers useful as a flexural bond strength enhancing material in the present invention comprise a copolymer of a polyoxyalkylene derivative as represented by the following formula (1) and maleic anhydride, a hydrolyzed product of the copolymer, or a salt of the hydrolyzed product;

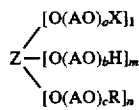

wherein "Z" represents a residue of a compound having from 2 to 8 hydroxy groups; "AO" represents an oxyalkylene group having from 2 to 18 carbon atoms; "X" represents an unsaturated hydrocarbon group having from 2 to 5 carbon atoms; "R" represents a hydrocarbon group having from 1 to 40 carbon atoms; "a" represents 1 to 1,000; "l" represents 1 to 7, "m" represents 0 to 2; and "n" represents 1 to 7; "l"+"m"+"n"=2 to 8, "m"/("l"+"n") is less than or equal to ½ and "al"+"bm"+"cn" is equal to or greater than 1. The copolymer shown above is taught in U.S. Pat. No. 4,946,904, issued to Akimoto et al., which patent is incorporated by reference as if fully set forth herein.

Another exemplary flexural bond strength enhancing material for use in the present invention may comprise water-soluble linear copolymers of N-vinylamides with monomeric addition products of amines, amino acids, amino groups containing aromatic sulfonic acids, amino alcohols of maleic anhydride as well as maleic esters of polyoxyalkyleneglycols or their monoethers. One structural unit is represented by Formula (A) or by Formula (B); the other partial structure unit being represented by Formula (C):

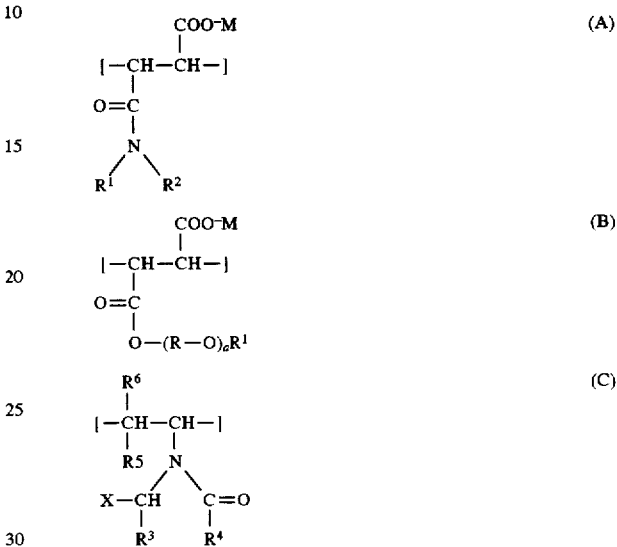

wherein $R^1$ and $R^2$, which may be the same or different, each represent hydrogen, a $C_1$–$C_{20}$ alkyl residue which may optionally include alkali metal carboxylate or alkaline earth metal carboxylate groups, an aromatic group, an liphatic or cycloaliphatic residue which may optionally include sulfonic acid groups or alkali metal sulfonate or alkaline earth metal sulfonate groups, a hydroxyalkyl group, preferably a hydroxy ethyl- or hydroxypropyl group, or may together with the nitrogen atom to which they are bound, form a morpholine ring;

M represents a hydrogen ion, a monovalent or divalent metal ion or a substituted ammonium group;

R represents a hydrogen atom or an alkyl group having 1 to 4 carbon atoms; p, q, and r are integers; a represents an integer ranging from 1 to 100;

$R^3$ and $R^4$ which may be the same or different, each represent hydrogen, a $C_1$ to $C_{12}$-alkyl residue, a phenyl residue, or may together form a di-, tri-, or tetramethylene group, which form with the inclusion of the residue of the formula:

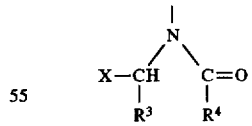

a five, six, or seven membered ring;

$R^5$ and $R^6$ which may be the same or different, each represent hydrogen, a $C_1$ to $C_{12}$-alkyl residue or phenyl residue; and X represents hydrogen, a $C_1$ to $C_4$-alkyl residue, a carboxylic acid group, or an alkli metal carboxylate group. Such copolymer is known and taught in U.S. Pat. No. 5,100,984 issued to Burge et al., and assigned to Sika AG, which patent is incorporated fully by reference as if set forth herein.

EXAMPLE 1

This example illustrates the bond strength problem created by admixtures containing typical water repellency materials. Terms, procedures and materials used for experiments described in this and the following examples are set forth below.

Bond Testing: The strength of the mortar bond between concrete masonry units (CMUs), in this case bricks, is determined using the apparatus and procedure described in ASTM standard C 1072-94, entitled "Standard Test Method for Measurement of Masonry Flexural Bond Strength." According to this method, brick prisms (assemblies) that are six bricks high and have five mortar joints are prepared. These prisms are stored in a plastic bag and cured for a given time period. They are then tested for flexural bond strength by measuring the flexural force required to break the bond between the mortar and the brick for each mortar joint. Essentially, this flexural bond test entails attaching bars or handles to adjoining bricks or masonry units connected by a mortar joint and measuring the force or load required to twist or "wrench" the bricks apart. Test results for all joints for a given batch of mortar are averaged and reported as average flexural bond strength for that particular mortar/brick combination. All bond strength data reported in these examples represent an average of bond strength of at least 15 bonds.

Water Repellency Testing: Water-repellency of the mortar is quantified using a water uptake test. In this test, the cured mortar sample is placed in 3 mm deep water, and the amount of water absorbed by 30 sq. in. area of mortar sample after 24 hours is reported as the "water uptake" value for that sample. Higher water-repellency is indicated by a lower value of water uptake. In addition, the amount of water required to saturate the sample is measured and reported as "% absorption (grams of water absorbed per gram of mortar sample)." Lower absorption values indicate a higher water-repellency.

Preparation of bond strength enhancing polymers BP-1 and BP-2: The general principle of preparation of bond strength enhancing polymers is based on the method described in U.S. Pat. No. 5,393,343. The two polymer samples (BP-1 and BP-2) used in examples 2 and 3 were prepared as follows:

BP-1: Polyacrylic acid (50% solution, 5000 molecular weight) was combined with a polyethylene-polypropylene oxide polymer (molecular weight 2000) in the mole ratio of 1:17. The polyethylene-polypropylene oxide polymer used in this synthesis contained a primary amine group and a methyl group as the terminal groups. The mixture was heated and maintained at 180° C., while under flowing nitrogen gas stream for a total of 2 hours. The water of solution and formed as by-product was removed in the nitrogen gas stream. Upon cooling to ≈50° C., the reaction product was neutralized with 40% (wt/wt) aqueous NaOH and total solids adjusted to 40% with deionized water. The resulting product was an amber viscous liquid.

BP-2: This polymer was prepared using a similar procedure as that described for the polymer BP-1 except that in this case, polyacrylic acid (50% solution, 5000 molecular weight) was combined with a polyethylene-polypropylene oxide polymer (molecular weight 1000) in the mole ratio of 1:10. The resulting product was an amber viscous liquid.

Other Materials: Two standard Ottawa sands known as "graded sand" and "20–30 sand" were used. These sands meet the requirements of ASTM C778-92, "Standard Specification for Standard Sand," and are mixed in a 50:50 ratio. The cement used is commercially available Type I cement. In addition, hydrated lime that is commercially available as Type S lime is used. Any chemical admixtures and the mounts, when used, are described as necessary for each experiment.

Mortar Mixing Procedure: A mortar batch is made by mixing 1 part (by weight) portland cement with 0.21 parts hydrated lime, 3.83 parts sand, and water along with any admixtures according to the mortar mixing procedure described in ASTM C 305-94, "Standard Practice for Mechanical Mixing of Hydraulic Cement Pastes and Mortars of Plastic Consistency." In terms of volume proportions, the mortar contains 1 part portland cement, 0.5 parts hydrated lime and 4.5 parts sand. This mortar mixture meets the prescribed proportion specification of a Type S mortar as described in ASTM C 270-95a, "Standard Specification for Mortar for Unit Masonry." Sufficient water is added to bring the samples to a standard consistency measured as a flow of 125% ±5%. Sample no. 1 contained 0.71 parts of water and no admix. Sample no. 2 contained CSD (available from PPG Industries, Pittsburgh, Pa.) and sufficient amount of water to obtain the same consistency of the mortar as Sample no. 1. For sample no. 2, 0.64 parts of water was used.

Experimental results are summarized in the following table:

TABLE 1

| | | | Results | | | |
|---|---|---|---|---|---|---|
| Sample N | Admixture Us | Parts of Admixture (Solids Based) per Cement | Absor-ption, | Water Upt g/30 in.$^2$ | Flexural Bo Strength, p (7 day) | Flexural Bond Strength Relat to Sample 1, (7 day) |
| 1 | None | 0 | 9.7% | 182 | 89 | 100% |
| 2 | CSD | 0.007 | 8.1% | 86 | 70 | 79% |

These experiments clearly demonstrate that the calcium stearate dispersion ("CSD") reduced the absorption and water uptake of the mortar significantly, thus making it more water-repellent. However, the flexural bond strength was reduced from 89 to 70 psi due to the presence of the CSD water-repelling agent, a reduction of 21%.

EXAMPLE 2

This example illustrates a preferred embodiment of the invention having CSD and a flexural bond strength enhancing polymer BP-1. The mortar achieved both water-repellency and flexural bond strength enhancement.

TABLE 2

| Sample N | Admixture Used | Parts of Admixture (Solids Based) per Cement | Results | | | |
|---|---|---|---|---|---|---|
| | | | Absorption, % | Water Uptake g/30 in.$^2$ | Flexural Bond Strength, psi (7 day) | Flexural Bond Strength Relative to Sample 1, (7 day) |
| 1 | None | 0 | 9.7% | 182 | 89 | 100% |
| 2 | CSD | 0.007 | 8.1% | 86 | 70 | 79% |
| 3 | CSD + BP-1 | 0.007 + 0.0018 | 7.4% | 68 | 118 | 133% |

Thus, it is clear that the CSD+BP-1 mixture (Sample 3) improved the flexural bond strength from 70 psi (for CSD alone, Sample 2) to 118 psi; a surprising 69% improvement. At the same time, the water-repellency of the mortar also improved in comparison with the mortar that contained the CSD alone as seen by significant reductions in the percentage absorption and water uptake values. Therefore, the CSD+BP-1 mixture not only improved the flexural bond strength, but also this two-component mixture enhanced the water-repellency, an achievement which suggests a strong synergism in the two-component compositions, cements, and methods of the present invention.

EXAMPLE 3

This example describes another embodiment of the invention wherein other flexural bond strength enhancing polymers, having a carbon-containing backbone to which are attached cement-anchoring members and oxyalkylene groups, are employed. For example, polymers available under the tradename Malialim AKM-0531 from Nippon Offs and Fats Co., Ltd., Tokyo, Japan, and Narlex LD-42 (available from National Starch & Chemical Company, Bridgewater, N.J.) were used in addition to polymer BP-2 to prepare further exemplary admixtures of the present invention. These admixtures also showed improved flexural bond strength enhancing properties when incorporated into the mortar with the calcium stearate dispersion, although the bond strength improvements with Malialim AKM-0531 and Narlex LD-42 were not as much as those observed with BP-1 and BP-2. The following table summarizes the bond strengths of mortars using these polymers relative to the bond strength of mortar without any admix.

TABLE 3

| Sample N | Admixture Used | Parts of Admixture (Solids Based) per of Cement | Flexural Bond Strength, psi (7 day) | Flexural Bond Strength Relative Sample 1, % (7 day) |
|---|---|---|---|---|
| 1 | None | 0 | 89 | 100% |
| 2 | CSD | 0.007 | 70 | 79% |
| 3 | CSD + BP-1 | 0.007 + 0.0018 | 118 | 133% |
| 4 | CSD + BP-2 | 0.008 + 0.0014 | 123 | 138% |
| 5 | CSD + Malialim AKM-0531 | 0.008 + 0.0012 | 110 | 124% |
| 6 | CSD + Narlex LD-42 | 0.008 + 0.0015 | 83 | 93% |

As shown by the figures for flexural bond strength after 7 days, each of the combinations of CSD+bond strength enhancing polymer provided a flexural bond strength that far exceeded the 79% figure for CSD alone, and suggests a strong synergism in the two-component compositions, cements, and methods of the present invention.

The foregoing examples are provided for illustration only and are not intended to limit the scope of the invention, as claimed.

We claim:

1. A composition for improving water repellency and flexural bond strength in mortar, comprising: (a) calcium stearate; and (b) at least one masonry bond strength enhancing material comprising a copolymer having a carbon-containing backbone to which are attached cement-anchoring members and oxyalkylene groups attached by linkages selected from the group consisting of an amide, an imide, and an ester.

2. The composition of claim 1 wherein said calcium stearate is calcium stearate dispersion.

3. The admixture of claim 1 wherein said calcium stearate is present in the amount of 5–50% total dry weight solids, and said bond strength enhancing material is present in the amount of 1–50% total dry weight solids.

4. The admixture of claim 1 wherein the calcium stearate and bond strength enhancing material are present in a dry weight solids ratio of 10:1 to 0.5:1.

5. The admixture of claim 1 wherein said copolymer is formed by reacting an acrylic polymer with ammonia or an alkoxylated amine represented by the formula:

in which BO represents a $C_2$–$C_{10}$ (preferably a $C_2$–$C_4$) oxyalkylene group in which O represents an oxygen atom and B represents a $C_2$–$C_{10}$ (preferably a $C_2$–$C_4$) alkylene group or mixture; and R" represents a $C_1$–$C_{10}$ (preferably $C_1$–$C_4$) alkyl group and n is an integer selected from 1 to 200 and preferably from 1 to 70.

6. The admixture of claim 1 wherein said copolymer comprises a carbon containing backbone to which is attached groups shown by the following structures (I) and (II) and optionally (III) and (IV):

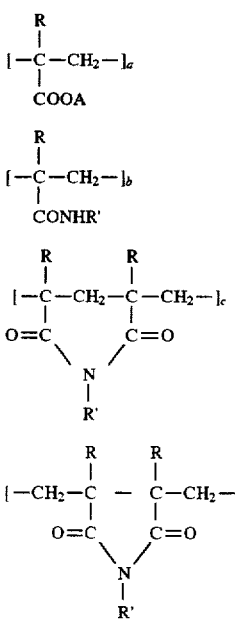

(I)

(II)

(III)

(IV)

wherein each R independently represents a hydrogen atom or a methyl group (—$CH_3$) group; A represents hydrogen atom, a $C_1$-$C_{10}$ alkyl group, R' or an alkali metal cation or a mixture thereof; R' represents a hydrogen atom or a $C_2$-$C_{10}$ oxyalkylene group represented by $(BO)_nR''$ in which O represents an oxygen atom, B represents a $C_2$-$C_{10}$ alkylene group, R'' represents a $C_1$-$C_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than [100–(a+c+d)].

7. The admixture of claim 6 wherein said copolymer further comprises at least one group from the structures (III) and (IV):

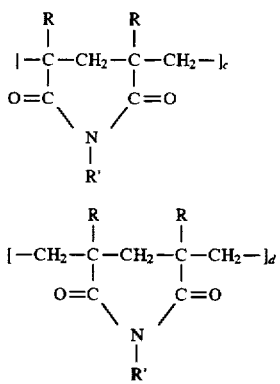

(III)

(IV)

wherein A is a hydrogen atom or an alkali metal cation; R' is at least from 50–90 weight percent of the polymer and comprises polyoxyethylene or polyoxypropylene units or mixtures thereof; a has a numerical value of from 60–70, and the sum of c and d is a numerical value of at least 3 (preferably at least 5) to the value of (100–a).

8. The admixture of claim 1 wherein said copolymer is formed by reacting an acrylic polymer with ammonia, an alkoxylated amine or polyoxyalkylene alcohol to provide a functional side chain represented by the formula $R^4$—$(OA^2)_x$—Q— wherein

Q=O or NH;

$A^2$=$C_1$-$C_{10}$ alkylene;

x=1 to 200; and $R^4$=$C_1$-$C_{10}$ alkyl.

9. The composition of claim 8 wherein said $A^2$=$C_2$-$C_5$ alkylene; and said $OA^2$ comprises ethylene oxide, propylene oxide, or a combination thereof.

10. The admixture of claim 9 wherein said copolymer comprises a carbon-containing backbone having cement attaching groups and oxyalkylene groups attached to the backbone by a linkage selected from amide and imide, said groups having the structures (I) and (II), and optionally structures (III) and (IV):

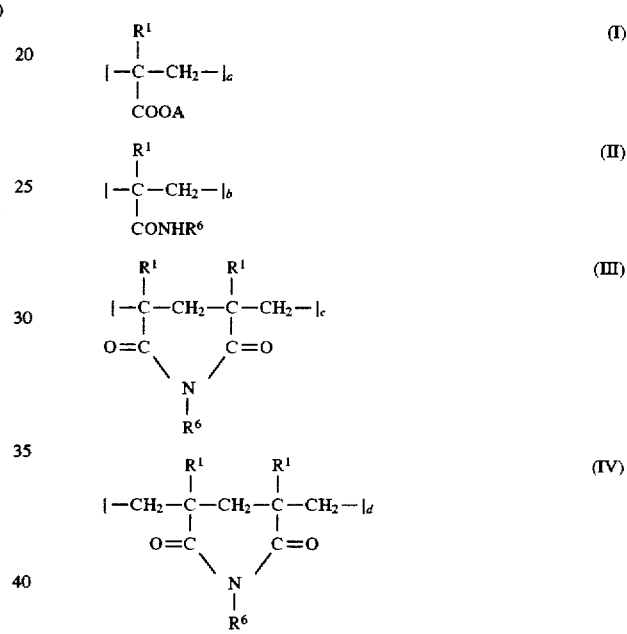

wherein each $R^1$ independently represents a hydrogen atom or a $C_1$-$C_5$ alkyl (preferably methyl ($CH_3$—)) group; A represents a mixture of Z and $R^2$; Z represents hydrogen atom, monovalent or divalent metal cation, ammonium group or organic amine group; $R^2$ represents an air detraining polyoxyalkylene group represented by $(BO)_n R^3$ in which O represents an oxygen atom, B represents a $C_1$-$C_{10}$ alkylene group, $R^3$ represents a $C_1$-$C_{10}$ alkyl group and n represents an integer of from 1–200, or mixtures thereof; $R^6$ represents a polyoxyalkylene group represented by $(BO)_n R^3$; and a, b, c and d are numerical values representing molar percentage of the polymer's structure such that a is a value of about 1 to 99; the sum of c+d is a value of 0 to the numerical value of (100–a); and b is a remainder value of [100–(a+c+d)].

11. The admixture of claim 10 wherein said copolymer comprises an imidized acrylic polymer and further comprises at least one of the structures (III) and (IV).

12. The composition of claim 1 wherein said (1) calcium stearate and said (2) copolymer are mixed together and thereby operative to be introduced into mortar as one component.

13. The composition of claim 1 wherein said bond strength enhancing material comprises a copolymer of a polyoxyalkylene derivative and a maleic anhydride.

14. The composition of claim 1 wherein said bond strength enhancing material comprises linear copolymers of N-vinylamides with addition products selected from the group consisting of amines, amino acids, amino groups containing aromatic sulfonic acids, amino alcohols of maleic anhydride, and maleic esters of polyoxyalkyleneglycols or their monoethers.

15. A cementitious composition comprising (a) cement; (b) calcium stearate; and (c) a flexural bond strength material comprising a copolymer having a carbon-containing backbone to which are attached cement-anchoring members and oxyalkylene groups.

16. Method for simultaneously improving flexural bond strength and water repellency in a mortar composition, comprising: combining, into a mortar composition comprising a cementitious binder and sand (1) calcium stearate, and (2) at least one masonry bond strength enhancing material comprising a copolymer having a carbon-containing backbone to which are attached cement-anchoring members and oxyalkylene groups attached by linkages selected from the group consisting of amide, imide, and ester.

17. The method of claim 16 wherein flexural bond strength enhancing material comprises a copolymer having a carbon containing backbone to which is attached groups shown by the following structures (I) and (II) and optionally (III) and (IV):

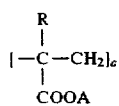 (I)

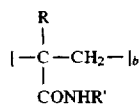 (II)

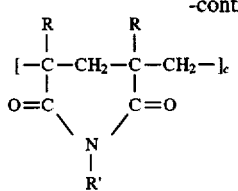 (III)

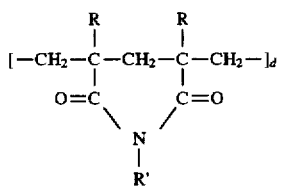 (IV)

wherein each R independently represents a hydrogen atom or a methyl group (—$CH_3$) group; A represents hydrogen atom, a $C_1$–$C_{10}$ alkyl group, R' or an alkali metal cation or a mixture thereof; R' represents a hydrogen atom or a $C_2$–$C_{10}$ oxyalkylene group represented by $(BO)_nR''$ in which O represents an oxygen atom, B represents a $C_2$–$C_{10}$ alkylene group, R'' represents a $C_1$–$C_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than |100–(a+c+d)|.

18. The composition of claim 1 wherein said copolymer backbone comprises a carboxylic acid, an acrylic acid, a methacrylic acid, a maleic acid, a fumaric acid, a citraconic acid, an itaconic acid, a (meth)allylsulfonic acid, a vinyl sulfonic acid, or mixture thereof.

* * * * *